Oct. 20, 1970     A. S. TUCKER     3,534,443
INJECTION MOLDING APPARATUS
Filed Feb. 28, 1968     2 Sheets-Sheet 1
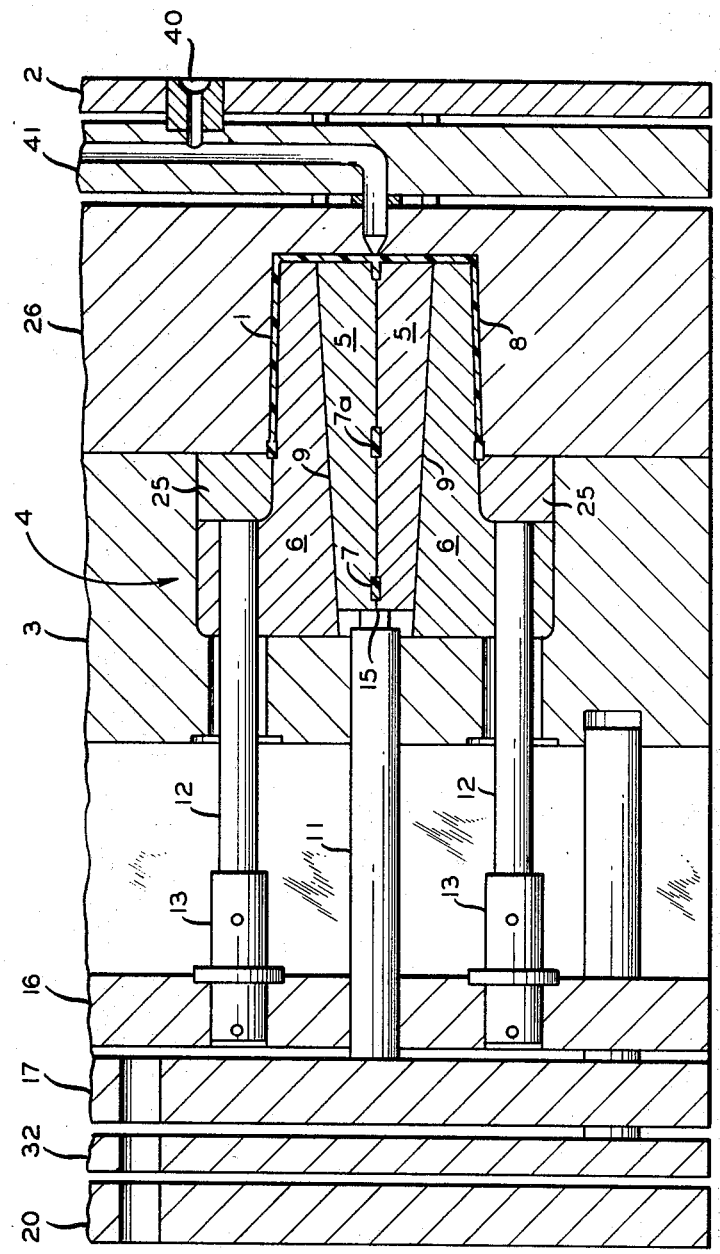
FIG. 1
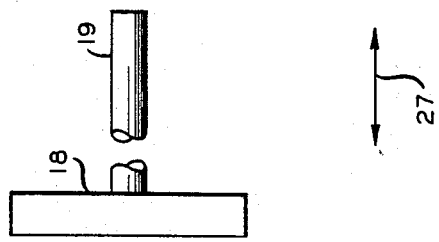
INVENTOR.
A. S. TUCKER
BY
ATTORNEYS Oct. 20, 1970    A. S. TUCKER    3,534,443
INJECTION MOLDING APPARATUS
Filed Feb. 28, 1968    2 Sheets-Sheet 2
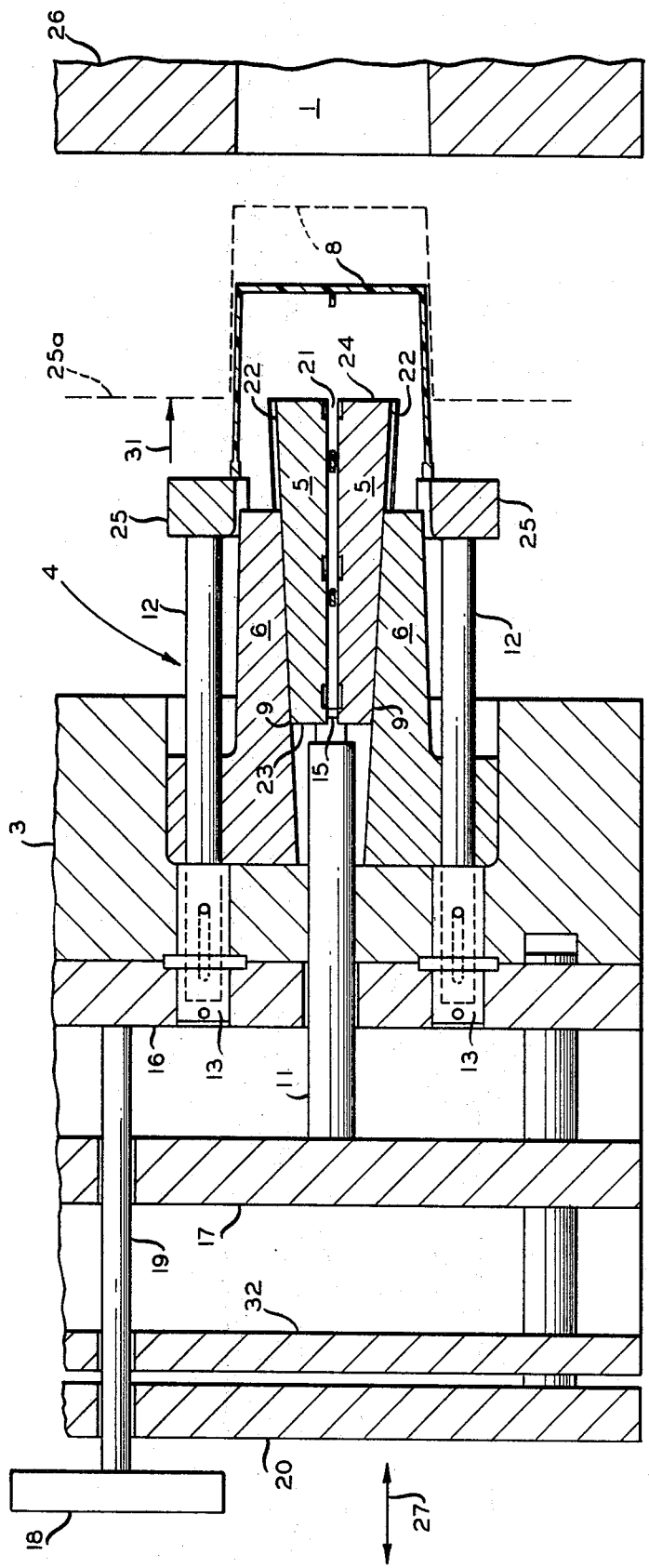
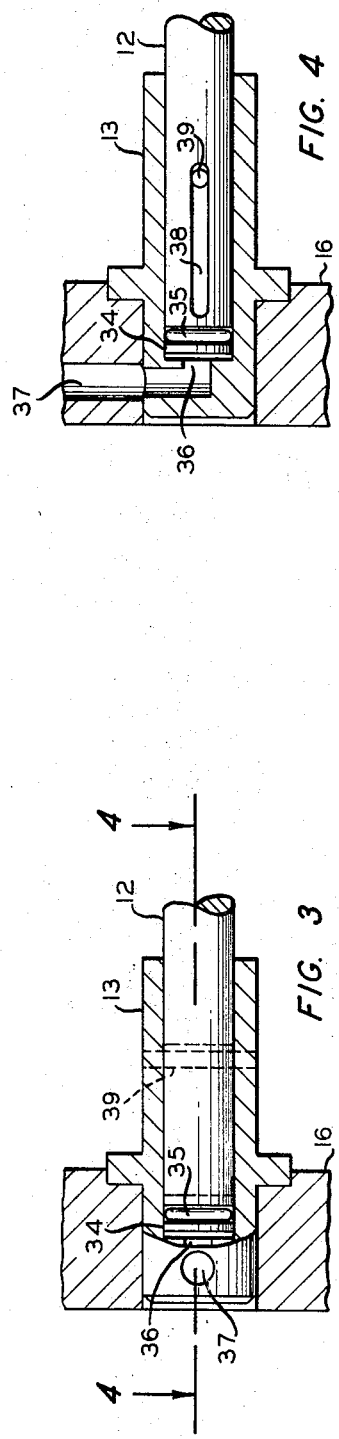
INVENTOR.
A. S. TUCKER
BY
*Young - Briggs*
ATTORNEYS United States Patent Office 3,534,443
Patented Oct. 20, 1970

3,534,443
INJECTION MOLDING APPARATUS
Alvin S. Tucker, Dexter, Mich., assignor to Phillips
Petroleum Company, a corporation of Delaware
Filed Feb. 28, 1968, Ser. No. 709,070
Int. Cl. B29c 7/00
U.S. Cl. 18—42
4 Claims

ABSTRACT OF THE DISCLOSURE

An injection molding apparatus comprises male and female mold parts reciprocally mounted, the male mold part having severable sections reciprocally mounted relative to the remainder of the male mold part and operated by an ejector rod driven by an ejector support reciprocally movable relative to the male mold part and an ejector bar driven by the ejector support for removing a molded article from the male mold part and being pneumatically extendable beyond its minimum extended length.

BACKGROUND OF THE INVENTION

The design and operational characteristics of molding, particularly injection molding apparatus, are quite often influenced more by considerations of expediency than by the nature and design of the molded article due to the simplicity of such articles. It is, of course, desirable to mold a finished article in a single piece if apparatus and processing expense such as mold cost and cycle time are not prohibitive. These aspects of mold design and process sequence are, of course, complicated by the structural characteristics of more complex articles which require three-dimensional thickness variation between two or more points in a single article. Such an article is illustrated in U.S. Pat. No. 3,281,010. The article carrying device disclosed and claimed in that patent will be referred to during the course of this disclosure to illustrate the method and apparatus which are a part of this invention.

It is, therefore, one object of this invention to provide an improved injection molding apparatus. It is another object of this invention to provide a method and apparatus for molding articles having three-dimensional thickness variations between two or more points on the finished article. It is yet another object of this invention to provide an improved apparatus for molding the article carrier disclosed in U.S. Pat. No. 3,281,010.

SUMMARY OF THE INVENTION

In accordance with one embodiment of this invention, an article or articles are injection molded in a severable mold having male and female mold parts wherein the male mold part comprises at least two severable portions which can be displaced relative to each other to enable the removal of a finished article from the mold. The mold is further provided with ejector means for effecting the relative reciprocal movement of the severable male mold parts and for expelling a molded article from the male mold.

In one embodiment, these ejector means can comprise an ejector rod driven by an ejector and engaging a severable portion of the male mold part, thereby causing the relative reciprocal movement of that portion of the male mold relative to the remainder of the male mold part upon relative movement between the ejector support and the male mold part. The mold of this embodiment would also comprise an ejector bar driven by the ejector support or a similar support driven concurrently with the ejector support, and engaging a portion of the finished article retained on the male mold part to eject the article from the male mold due to relative reciprocal motion between the ejector bar and the male mold.

Due to the design of articles produced by such procedures, such as the articles discussed in U.S. Pat. No. 3,281,010, it is necessary that the relative movement of the severable male mold parts be effected to a certain degree concurrently with the engagement of the ejector bar or article ejector with the finished article in order to prevent distortion or destruction of the finished article during its removal from the mold. However, this procedure dictates that the effective travel, i.e., the distance of travel after engagement, of the ejector bar exceed the effective travel of the ejector rod and several mold part where the ejector rod and ejector bar are driven by the same means. However, the effective travel of the ejector bar is limited by the movement of the ejector support. This effect would result in the insufficient relative movement between the finished article and the severable male mold part to enable the complete ejection of the finished article from the mold. It is to this problem that this invention is directed in part.

Briefly, this problem is solved by providing an apparatus in which the effective travel of the ejector bar is extended to further exceed the effective travel of the ejector rod, or wherein the effective travel of the finished article exceeds the travel of the severable mold part although the ejectors producing each of these effects, i.e., the ejector rod and the ejector bar, are driven by the same support means and although the travel of the severable male mold part is initiated concurrently with the engagement of the article ejector (ejector bar) with the finished article.

This result and the apparatus and method of this invention can be more clearly understood by reference to the drawings, of which FIG. 1 is a sectional view of an injection mold in closed position illustrating the ejector mechanisms; FIG. 2 is a sectional illustration of the apparatus of FIG. 1 in opened position illustrating the actuation of the ejector mechanisms and the displacement of the severable male mold parts and article ejector (ejector bar); FIG. 3 is a first sectional view of an ejector bar actuator, i.e., article ejector, suitable for application in this invention, e.g., a pneumatically extendable ejector mechanism; and FIG. 4 is a second sectional view of the apparatus of FIG. 3 offset 90° from the section illustrated in FIG. 3 along the section 4—4.

FIG. 1 illustrates an injection molding apparatus comprising severable female mold part 26 containing cavity 1 mounted on retainer plate 2 which, for purposes of this description, will be considered to be stationary. This apparatus is a two-cavity mold comprising two male mold parts illustrated generally at 4 and two cavities 1, of which only one is illustrated in the drawing due to the sectional cut. The second part of the mold, the male mold part, is mounted on core block 3 which itself is reciprocally mounted on an axis indicated by arrows 27 by any suitable reciprocal support means.

This movable mold part further comprises knockout plate 18 to which knockout rod 19 is fixedly attached. This knockout plate and rod do not function when the mold is in the closed position, as illustrated in FIG. 1, and will be further discussed in connection with the operation of the mold in the open position, as illustrated in FIG. 2. The male mold part which enters the cavity of the female mold part comprises stationary male mold portions 6 and severable reciprocally movable male mold parts 5, the outer surfaces of which, i.e., the surfaces adjacent the inner surface of the female cavity, conform to the internal dimensions of the molded article 8 when the mold is in the closed position as illustrated in FIG. 1. In the embodiment illustrated in FIG. 2, the thickness of the severable mold parts 5 at their extremity adjacent the interior of the female mold part, i.e., and 24, is greater than the thickness at the opposite extremity 23. This feature is further illustrated by the taper of line 9 along which the severable mold parts 5 are caused to move reciprocally relative to the stationary male mold parts 6 and provide that when the severable mold portions 5 are forced outwardly from the remainder of the male mold as the mold is opened, a space 21 results between mold portions 5 to enable removal of the article handle 7 and center portion 7a contained in the interior of the male mold part. This severable design and operation of the male mold 4 is necessitated by the design of a molded article 8 such as the six-pack carrier of U.S. Pat. No. 3,281,010, which can be fabricated as an integral unit by the apparatus illustrated in FIGS. 1 and 2. Certain portions of the handle 7 of this carrier 8, fabricated within the interior of the male mold in this embodiment, are thicker than the dividers in the body of the carrier 8 which are formed by conforming a moldable material to the center portion 7a provided between the several portions of the male mold. As a result, it is necessary to provide for the enlargement of the space 21 between severable mold parts 5 in order to enable the removal of handle 7 and center portion 7a along with the remainder of the carrier 8 from the male mold part in the direction indicated by arrow 31 in FIG. 2.

In this embodiment, this function of providing for expansion of the space 21 between the severable mold parts 5 is accomplished by forcing these severable mold parts outwardly from the remainder of the male mold as illustrated in FIGS. 1 and 2. As these portions of the mold are forced outwardly, they travel along the plane defined by line 9, i.e., surface 22, which is angled outwardly with respect to the major central axis of the male mold part. As a result, the severable mold parts diverge from each other with the result that the spacing between them, 21, is increased by an amount sufficient to allow passage of the thicker handle 7 and center portion 7a of the molded article 8 through the enlarged space thus created.

Other elements of this embodiment which are employed to effect the severance of the male mold as described and ejection of the molded article 8 from the male mold are ejector rod 11 driven by reciprocating core ejector plate or support plate 17 and fixedly engaged with the severable mold parts 5 illustrated at 15. The article ejector means of this embodiment comprises ejector arm 12, pneumatic ejector arm extended 13 which is in turn driven and supported by a second ejection plate 16 which, in a manner similar to the first ejection plate 17, is reciprocally mounted within the male core block 3. During the removal of a finished molded article 8 from the male mold, the ejector bar 25 driven by ejector arm 12 engages the outer portion of the finished article 8 and forces it off of the male mold. In order to distribute the force imparted to the finished article by the ejector bar evenly throughout the article, it is desirable that the ejector bar contact the perimeter of the article along both sides and partly across both ends. This feature is not illustrated in the drawings for purposes of simplicity.

During the relative movement of the male mold core block 3 away from the mold cavity block 26, the knockout rod 19 mounted on knockout plate 18 passes through the platen 20, core retainer plate 32, and core ejection plate 17 as illustrated in FIG. 2. Ejector plate 17 is latched to ejector plate 16 by means not shown and moves with ejector plate 16 during a portion of its travel. Knockout rod 19 contacts reciprocally mounted ejector plate 16 causing movement of both ejector plates 16 and 17 thereby driving pneumatic cylinder, i.e., ejector bar extender 13, ejector arm 12, ejector bar 25, ejector rod 11, and severable mold parts 5 forward to the stationary mold portion 6, thereby partially expelling the finished article 8 from the male mold so that it is retained on the severable mold parts 5.

Due to the necessity of extending the severable male mold parts 5 in the manner above-described in order to provide for expansion of space 21 between opposing severable parts, a greater degree of travel of the ejector bar 25 is necessary in order to effect the disengagement and ejection of the molded article 8 from the thus-extended male mold portions. However, it is also necessary that the severable portions 5 be extended to provide expansion of the point of cleavage 21 before the initiation of any relative movement between the molded article 8 and the severable mold parts in order to prevent distortion of the finished article. As a result, it is necessary that the overall travel of ejector bar 25 relative to the stationary mold parts 6 be greater than the relative travel of severable mold parts 5 and ejector rod 11 relative to the stationary male mold parts. This result is accomplished in this embodiment by providing a means for extending the travel of ejector bar 25 and ejector arm 12 independently of and to a greater extent than the reciprocal travel of ejector plates 16 and 17. In this embodiment, this function is accomplished by the provision of the pneumatic extender device 13 which is preferably a pneumatic cylinder containing a piston which in turn drives ejector arm 12 and ejector bar 25 a predetermined distance to position 25a relative to the stationary and the severable mold parts 6 and 5, respectively, in order to eject the finished article 8 from the mold.

The ejector cylinder 13 which can be employed in one embodiment of this invention to provide the added independent travel of ejector arm 12 and ejector bar 25 is illustrated in more detail in FIGS. 3 and 4. The pneumatic cylinder 13 is driven and supported by ejector plate 16. Ejector arm 12 is reciprocally mounted within cylinder 13 and is provided at one extremity 34 with seal ring 35 or other suitable sealing means to provide a substantially fluid-tight seal between ejector arm 12 and the interior of the cylinder. The reciprocal travel of arm 12 is limited by stationary pin 39 positioned in the side walls of cylinder 13 and passing through a slot 38 in ejector arm 12. Pressurized fluid which can be either gas or liquid is passed into the cylinder by way of conduits 37 and 36 to force the ejector arm to the extended position. Following ejection of the article from the extended severable male mold portions by extension of ejector arm 12 and ejector bar 25, it is necessary that the ejector bar and arm be retracted to their original position illustrated in FIG. 1. This can be accomplished by reducing the pressure within cylinder 13 to a point sufficiently below atmospheric pressure to cause ejector arm 12 to retract into the cylinder. It is preferably accomplished by one or more ejector plate return rods driven by cavity block 26 so that the etxended portions are returned to their original position without contacting cavity section 1. In the alternative, the ejector arm can be spring biased to the closed, i.e., retracted, position. Such spring biasing means have not been illustrated in the drawings for purposes of clarity. Numerous alternative means for accomplishing this particular purpose are well known in the art.

Following ejection of the finished article from the mold, the ejector arm 12 is retracted into cylinder 13, as described, and the core block 3 is moved toward the cavity block 26 into closed position. During this movement of core block 3, the ejector plates 16 and 17 are restrained by suitable blocking means so that the core block 3 moves toward the cavity block 26 relative to the ejector plates. As a result of this relative movement between the core block and ejector plates, the ejector bar 25, ejectors 11 and 12, and severable mold parts 5 are retracted to their original positions illustrated in FIG. 1 prior to engagement of the core block and cavity block. Any suitable moldable material, of which many are well known in the art, such as natural and synthetic resins, plastic and elastomers, is then injected into the mold through passage 40 and runner block 41 as illustrated in FIGS. 1 and 2, after which the cycle is repeated.

Obviously, many alternate equivalent mechanical devices can be employed to accomplish the specific functions of the several features of this apparatus discussed in the aforegoing disclosure. For example, the necessary additional reciprocal extension of ejector arm 12 relative to ejector plate 16 can be accomplished by the use of suitable gears, mechanical linkages and the like. However, the use of a device such as the fluid operated cylinder 13 to accomplish this function is presently preferred. Exemplary of another modification that could be made within the scope of this invention is an apparatus in which the ejectors 11 and 12 operating the severable male mold parts and ejector bar, respectively, could be supported by and/or driven directly by a single ejector plate rather than the dual ejector plate system described.

I claim:

1. Apparatus for injection molding comprising a female mold part and a severable male mold part reciprocally mounted relative to said female mold part and to ejector support means positioned along the reciprocation axis of said male mold part, at least one portion of said male mold part being reciprocally mounted relative to the remainder of said male mold part, core ejector means supported and driven by said ejector support means, and engaging said one portion of said male mold part for forcing said one portion of said male mold part out of engagement with the remainder of said male mold part when said mold is opened, article ejector means supported and driven by said support means and engaging a portion of a molded part on said male mold when partially open for expelling said article from said male mold part, said article ejector comprising extender means for extending the travel thereof when actuated relative to said ejector support means.

2. The apparatus of claim 1 wherein said extender means is a fluid activated piston.

3. The apparatus of claim 2 wherein the male mold travel distance from closed position to the engagement point of said ejector means with said severable male mold part is greater than the travel distance from closed position to the engagement point of said article ejector with said molded part.

4. The apparatus of claim 3 further comprising means for actuating said extender means in response to the travel of said male mold part.

References Cited

UNITED STATES PATENTS

| | | | |
|---|---|---|---|
| 2,366,475 | 1/1945 | Bartholomew | 249—59 |
| 3,289,252 | 12/1966 | Bromley. | |

FOREIGN PATENTS 648,121 10/1962 Italy.

J. HOWARD FLINT, JR., Primary Examiner

U.S. Cl. X.R.

18—2, 45; 249—63, 68